United States Patent [19]
Bergler

[11] Patent Number: 5,541,982
[45] Date of Patent: Jul. 30, 1996

[54] DEVICE FOR TRANSMITTING VIDEO AND AUDIO SIGNALS THROUGH AN INTEGRATED SERVICES DIGITAL NETWORK

[75] Inventor: Frank Bergler, Niefern, Germany

[73] Assignee: Alcatel N. V., Amsterdam, Netherlands

[21] Appl. No.: 547,850

[22] Filed: Oct. 25, 1995

Related U.S. Application Data

[63] Continuation of Ser. No. 112,689, Aug. 26, 1993, abandoned.

[30] Foreign Application Priority Data

Sep. 1, 1992 [DE] Germany .......................... 42 29 151.8

[51] Int. Cl.$^6$ .................................................. H04M 11/00
[52] U.S. Cl. .................................................. 379/93; 348/14
[58] Field of Search ............................. 348/13, 14, 15, 348/16, 17, 18, 19, 6, 7, 10; 455/4.1, 4.2, 5.1, 6.1, 6.3, 3.1; 379/93, 94, 98

[56] References Cited

U.S. PATENT DOCUMENTS

| | | | |
|---|---|---|---|
| 5,136,411 | 8/1992 | Paik et al. ................................. | 455/6.1 |
| 5,236,199 | 8/1993 | Thompson, Jr. ......................... | 455/4.2 |
| 5,247,347 | 9/1993 | Litteral et al. ........................... | 455/4.2 |
| 5,313,297 | 5/1994 | Fukui et al. .............................. | 348/12 |
| 5,329,308 | 7/1994 | Binns et al. .............................. | 348/14 |
| 5,351,076 | 9/1994 | Hata et al. ................................ | 348/14 |
| 5,367,331 | 11/1994 | Secher et al. ............................. | 348/14 |
| 5,448,285 | 9/1995 | Kadowaki ................................. | 348/14 |

FOREIGN PATENT DOCUMENTS 2242335   9/1991   United Kingdom .

OTHER PUBLICATIONS

"End User Premises Equipment Terminals for Broadband Applications" J. Huelamo et al, *Electrical Communication*, vol. 64, No. 2/3, 1990, pp. 205–217.

"Telefonieren von Angesicht zu Angesicht", *Kommunikationstechnik von SEL*, SEL Alcatel Group, pp. 1–8.

"Interaktive Breitband-kommunikation", W. Kaiser et al, Springer–*Verlag*, Berlin/Heidelberg/New York 1982, pp. 88–90.

"Das ISDN in der Einführung", P. Bocker, ITG–Fachbericht 100, *VDE–Verlag GmbH*, Berlin/Offenbach, 1988, pp. 467–474.

"Fernsehbilder in schmalen Kanalen", *Funkschau Bildfernsprechen*, pp. 104–106.

"ISDN/Das neue Fernmeldenetz der Deutschen Bundespost TELEKOM", P. Kahl, R.v.Decker's Verlang, G. Schenk, Heidelberg 1990, pp. 410–445.

W. Kaiser, Interaktive Breitbandkommunikation, Springer–Verlag, Berlin Heidelberg New York 1982, pp. 88–90; 106–119.

Ruopp, Gerhard: Ein universeller ISDN–Adapter fur herkommliche Endgerate—erste Erjahrungen aus dem ISDN–Pilotprojekt. ITG–Fachbericht 100. Das ISDN in der Eifuhrung. vortrage der ITG–Fachtagung vom 22. bis 24. Februar 1988 in Berlin, pp. 467–474.

N. N.: Fernsehbilder in schmalen Kanalen. In: Funkschau 10/ 1986, pp. 104–106.

(List continued on next page.)

*Primary Examiner*—Curtis Kuntz
*Assistant Examiner*—Stella L. Woo
*Attorney, Agent, or Firm*—Ware, Fressola, Van Der Sluys & Adolphson

[57] ABSTRACT

Transmission of video and audio signals through an integrated services digital network by low-cost means is carried out by a device in the form of a terminal adapter (TA-TV) to which conventional picture and sound recording devices (CAM) and picture and sound reproduction devices (TV) are connected. Device sockets (B, C) to which the picture and sound recording devices (CAM) and picture and sound reproduction devices (TV) are connected are provided on the terminal adapter (TA-TV). A connection with an integrated services digital network (ISDN) is provided via a network socket (A). The terminal adapter (TA-TV) performs an adaptation of the signals to the network.

11 Claims, 2 Drawing Sheets

OTHER PUBLICATIONS

Kahl, Peter: ISDN—Das neue Fernmeldenetz der Deutschen Bundespost TELEKOM, R.v.Decker's Verlag, G. Schenck, Heidelberg, 1990, pp. 410–445.

NTZ Nachrichtentechnische Zeitschrift, Bd. 44, Nr. 6, Jun. 1991 Berlin, DE, "Der PC als Endgerat fur die Videokommunikation" Andre E. Blitz, et al, pp. 394–397 & 400.

Ant Nachrichtentechnische Berichte, Bd. 1, May 1984, "Das realisierte BIGFON–System", Wolfgang Schmidt, pp. 13–20.

Nachrichten Elektronik Und Telematik, Bd. 45, Nr. 5, May 1991, Heidelberge DE, pp. 211–213, 'Objekt Im Netz', W. Frohberg.

Funkschau, Bd. 63, Nr. 12, 31 May 1991, Munchen De, 'Eine Symbiose Gewinnt Konturen' by G. Schaas pp. 28 & 30–32.

Nachrichtentechnische Berichte, Nr. 1, May 1984, Backnang DE "Codierung Der Tonrundfunk–Und Farbfernsehsignale", R. Arnold pp. 39–45.

ICC 91 International Conference on Communications, Bd. 1, Jun. 1991, Denver, "Desktop Multimedia Communications–Breaking the Chains" pp. 73–77.

DEVICE FOR TRANSMITTING VIDEO AND AUDIO SIGNALS THROUGH AN INTEGRATED SERVICES DIGITAL NETWORK

This is a continuation of application Ser. No. 08/112,689 filed on Aug. 26, 1993, now abandoned.

TECHNICAL FIELD

The invention pertains to a device and a terminal adapter for transmitting video and audio signals through an integrated services digital network.

BACKGROUND OF THE INVENTION

One thus far known possibility of transmitting video signals and audio signals through communication networks is transmission by means of a videophone. The picture recording device as well as the picture reproduction device and the sound recording device as well as the sound reproduction device are integrated in this particular instance into one terminal ("Telefonieren yon Angesicht zu Angesicht"; Kommunkationstechnik von SEL; SEL Alcatel Group; pp. 1–8). This means that already existing devices may not be utilized for this purpose, but all devices must be procured anew.

An additional device with telephone function characteristics is required to establish the connection and dial a subscriber. An analog interface is required by the end user, and a digital interface is in addition required in the network. A video phone thus represents a quite complicated and expensive method of transmitting video signals (J. Hu élamo, H.-J. Mosel, C. Ravelli, M. Weiss, "End User Premises Equipment and Terminals for Broadband Application," Electrical Communication, Volume 64, Number 2/3; 1990, pages 205 to 217).

Another known device for transmitting video signals and audio signals is a multimedia terminal. Multimedia functions may only be initiated by special terminals, namely such terminals which connect broadband communication with existing "workstations," personal computers or video devices. However, this device also represents a more complicated solution than the device according to the invention because a special Multimedia Communication Processing and Representation [MCPR]) is in this particular instance used in addition to a terminal adapter with a broadband-ATM (Analogous Transfer Mode)-multiplex-adapter (J. Hu élamo, H.-J. Mosel, C. Ravelli, M. Weiss, "End User Premises Equipment and Terminals for Broadband Application," Electrical Communication, Volume 64, Number 2/3; 1990, pages 205 to 217).

DISCLOSURE OF INVENTION

The invention is based on the objective to develop a device and a terminal adapter which perform the transmission of audio and video signals through an integrated services digital network.

According to the invention, this objective is attained by a terminal adapter for transmitting video and audio signals to and from an integrated services digital network (ISDN), for having at least one picture and sound recording device or at least one picture and sound reproduction device connected thereto, wherein the respective device is connected to the terminal adapter via a corresponding line with a first device socket or a second device socket, wherein the terminal adapter with a network socket is connected to the integrated services digital network (ISDN) via a corresponding line, and that the terminal adapter performs an adaptation of the video signals and the audio signals as well as a transmission to the integrated services digital network (ISDN).

One advantage of the invention can be seen in the fact that conventional picture and sound reproduction devices as well as picture and sound recording devices may be connected to the terminal adapter. Instead of utilizing an entirely new transmission unit, it is possible to supplement picture and sound reproduction devices and picture and sound recording devices existing in almost any household with an additional terminal adapter, to connect said devices to a communications network, and transmit video and audio signals in this fashion. The solution according to the invention thus represents a very low-cost method for transmitting video and audio signals.

An additional advantage of the invention can be seen in the fact that a flexible and rapid utilization at almost any location is possible in instances in which the device is intended as a monitoring system. A monitoring system of this type may be assembled very rapidly and operated in an uncomplicated fashion.

In further accord with the present invention, a keyboard may be installed into the terminal adapter, or the terminal adapter responds to a remote control in order to dial a subscriber. According to this aspect of the invention, an element which makes it possible to dial a subscriber by means of the terminal adapter is provided in addition to the device described previously.

In still further accord with the present invention a remote control of the picture and sound reproduction device may be used to dial a subscriber if the picture and sound reproduction device is connected to the terminal adapter via a SCART connector (a known video and audio connector with 20 pins) and a line and may be operated via the remote control. It is possible according to this aspect of the invention to perform the dialing of a subscriber by means of a remote control which is part of the picture and sound reproduction device if the picture and sound reproduction device is connected to the terminal adapter via a SCART connector. This represents an additional simplification of the device because an already existing device may be utilized to dial a subscriber.

According to a further aspect of the invention, a data processing device may additionally be connected to the terminal adapter via an interface, a subscriber is dialed by entering the subscriber number into the data processing device, or a subscriber number is programmed into the terminal adapter by means of the data processing device, or the data processing device is available to perform computation procedures with the data obtained form the video signals. According to this last aspect of the invention, an interface, for example a known V.24 interface (as recommended by CCITT), is added to the terminal adapter of the device described above.

Still further in accord with the present invention, the dialing of a subscriber may be performed via the integrated services digital network (ISDN), and a subscriber number may be stored in the dialed terminal adapter after an access control by means of a password. The measures disclosed according to the last-mentioned aspect of the invention make it possible for a subscriber to be dialed via the integrated services digital network, for example the ISDN network, after gaining access authorization. This also provides the possibility of a remote controlled monitoring system.

In further accord with the present invention, a keyboard may also be used to adjust transmitting or receiving parameters, or both. According to the last-mentioned aspect of the invention, the device utilized to dial a subscriber may also be used to adjust transmitting and/or receiving parameters. It is thus possible to adjust parameters such as brightness, volume and so forth individually.

Further still in accord with the present invention, the remote control may also be used to adjust transmitting or receiving parameters, or both.

According still further with the present invention, a device to dial subscribers may also be utilized to adjust transmitting or receiving parameters, or both.

In still further accord with the present invention, a terminal adapter for transmitting signals through an integrated services digital network (ISDN) comprises a network socket to produce a plug connection with the integrated services digital network (ISDN); a first module which is connected in the terminal in order to access the integrated services digital network (ISDN); a second module for ISDN-B-channel and ISDN-D-channel protocols which connected in the terminal adapter in order to define standardized procedure; a serial bus accessing and sensing within the terminal adapter; an element to pack or compress signals to be transmitted inform of blocks, whereby said element is connected to the serial bus; a video module which is connected to the element in order to process the video signals; an audio module which is connected to the serial bus in order to process the audio signals; an optional module which is connected to the serial bus, whereby different functions may be performed by the optional module; a microprocessor unit with memory components which is connected to the serial bus; at least one first device socket to connect a picture and sound recording device, whereby the first device socket is connected to the audio module as well as the video module; and at least one second device socket to connect a picture and sound reproduction device, whereby the second device socket is connected to the audio module as well as the video module.

The first module is constructed such that it may be adapted to an ISDN-network or a broadband-ISDN-network. This last-mentioned aspect of the invention discloses the different integrated services digital networks suggested for this instance. An adaptation to an ISDN-network or a broadband-ISDN-network should be made possible with the aid of the first module.

Two variations as well as one possible design of the terminal adapter are described below with the aid of the figures.

These and other objects, features and advantages of the present invention will become more apparent in light of the detailed description of a best mode embodiment thereof, as illustrated in the accompanying drawing.

BEST MODE FOR CARRYING OUT THE INVENTION

Figure 1:
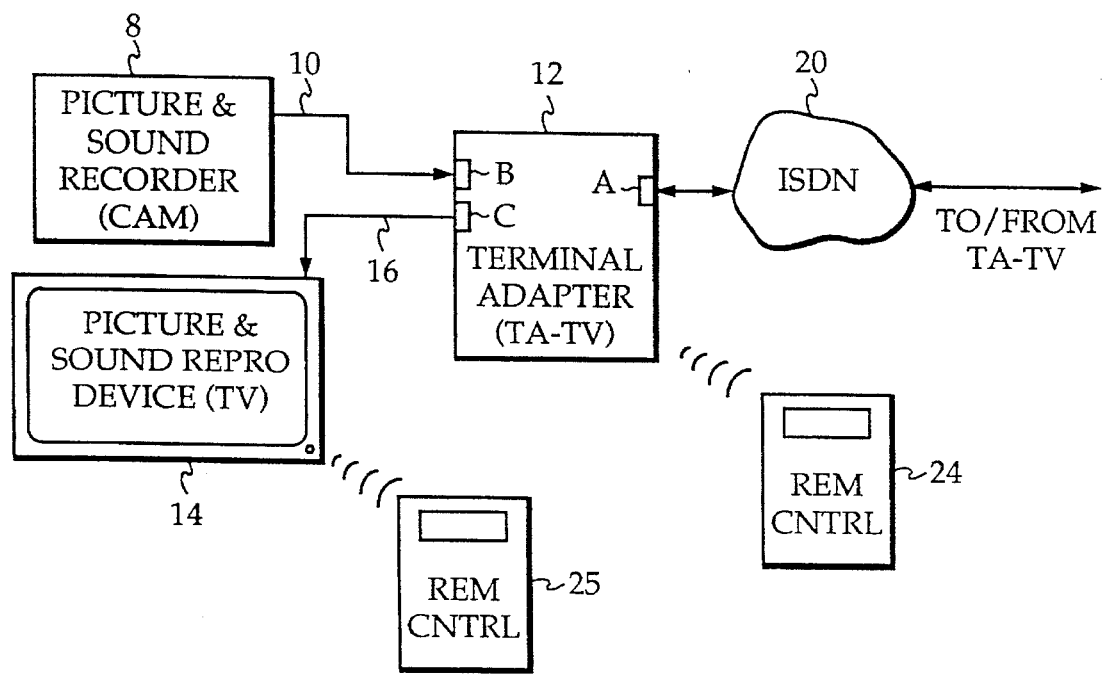
FIG. 1 a block diagram of the device according to the invention.

The device according to the invention for transmitting video and audio signals is in the following described with the aid of FIG. 1.

At least one picture and sound recording device 8 (CAM) is connected via a line 10 and a first device socket B to a terminal adapter 12 (TA-TV). At least one picture and sound reproduction device TV 14 or videorecorder (VREC) is also connected via a line 16 and a second device socket C to the terminal adapter 12 (TA-TV). The terminal adapter 12 is in turn connected via a network socket A and a line 18 to an integrated services digital network 20 (ISDN). An arbitrary number of connections 22 originating from the integrated services digital network 20 may be connected to various terminal adapters TA-TV (not shown).

Actual pictures and actual sounds recorded with, for example, a camcorder, or pictures and sound already recorded with, for example, a video recorder, are fed with the aid of the picture and sound recording device 8 (CAM) to the terminal adapter 12 (TA-TV). The pictures and the sound are processed in the terminal adapter if a subscriber has been dialed, which means that a subscriber call number has been entered and a connection with another subscriber has been established via the digital network 20 (ISDN), and subsequently transmitted to the subscriber equipped with the same device. The pictures and the sound arrive at the subscriber, are again processed by a terminal adapter, and transmitted to a picture and sound reproduction device TV, VREC, for example a television set, via the second device socket C and displayed on said reproduction device of the other subscriber.

Different possibilities may be considered to facilitate the dialing of a subscriber.

One possibility consists of providing an element which makes it possible to perform the dialing of a subscriber via the terminal adapter, by means of a keyboard installed into the terminal adapter 12 or a remote control 24 (IR), for example an infrared remote control, operating the terminal adapter. It is thus also possible to dial a subscriber via the terminal adapter.

A different possibility is provided if the device sockets B and C are SCART connectors. A subscriber call number may in this particular instance be entered with the aid of a remote control 25 (IR), for example an infrared remote control which is part of the picture and sound reproduction device. If the device sockets B and C are antenna sockets, the previously mentioned method of dialing a subscriber applies.

An additional possibility is provided if an interface, for example V.24, is added to the terminal adapter TA-TV by connecting a data processing unit, for example a personal computer, via this interface and that a subscriber is dialed by entering the subscriber number into the data processing device, or wherein a subscriber number is programmed into the terminal adapter (TA-TV) by means of the data processing device, or wherein the data processing device is available to perform computation procedures with the data obtained from the video signals. Different computation procedures, for example a comparison between different still pictures, as well as the dialing of a subscriber may be performed with this personal computer. It is also possible to store several call numbers in the data processing unit.

If a keyboard is installed in the terminal adapter 12 and used to dial subscribers, it may also be used to adjust transmitting and/or receiving parameters. The parameters, for example the brightness, volume, and so forth, may thus be adjusted individually.

The network socket A can either be an $S_0$, an interface specially designed for short connecting lines, or a $U_{PO}$, an interface specifically designed for terminal devices in telecommunication systems, both of which are specified by CCITT. In an instance where real-time pictures and sound are transmitted and where both video and audio recording devices and video and audio reproduction devices are connected at each subscriber, the device described thus far can be characterized as a type of picture telephone, or as a special design of a low-cost videophone.

Figure 2:
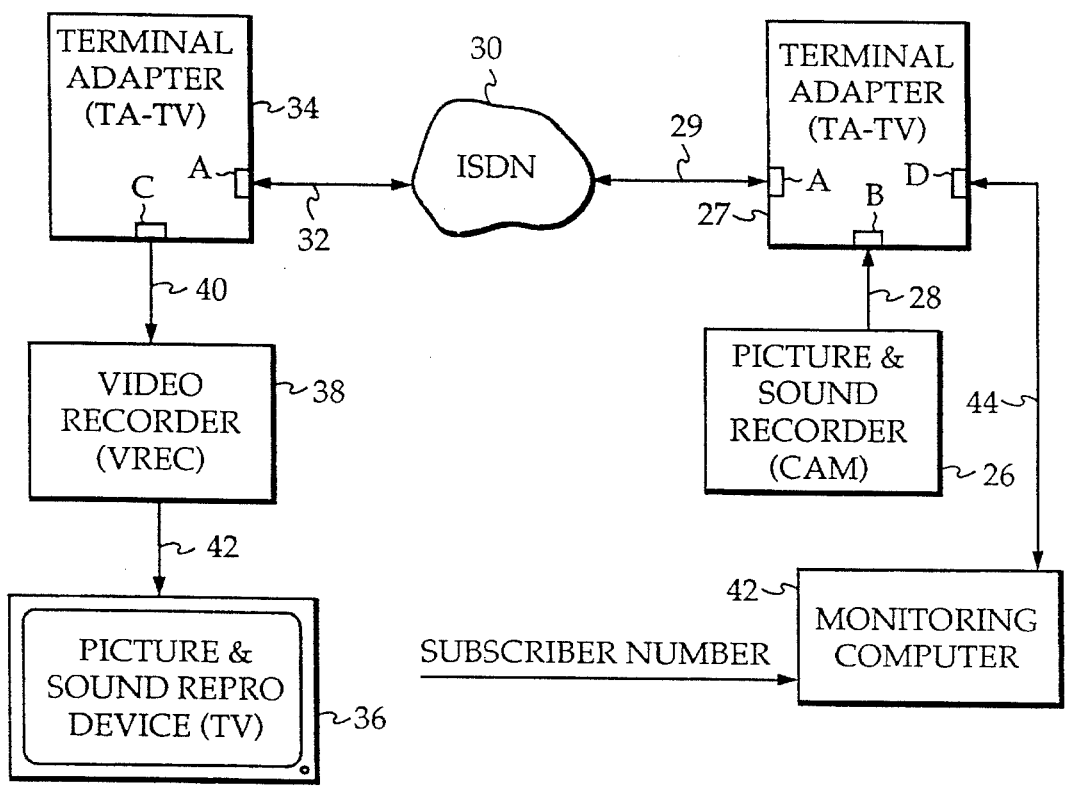
FIG. 2 a block diagram of a special variation of the device according to the invention, and FIG. 3 a block diagram of the terminal adapter according to the invention.

A special variation is in the following described with the aid of FIG. 2. This particular variation represents a monitoring system.

A picture and sound recording device CAM, for example a video camera 26, is connected to a terminal adapter 27 (TA-TV) via a first device socket B and a line 28. The video camera serves as a monitoring camera and records real-time pictures and sound and transmits the same on a line 29 to an integrated services digital network 30 (ISDN), for example an ISDN network, via the terminal adapter 27 (TA-TV).

The pictures and the sound are transmitted via the ISDN network on a line 32 to an additional subscriber, for example a security or monitoring company. The arriving signals are again processed by a terminal adapter 34 (TA-TV) and transmitted to a picture and sound reproduction device 36 (TV), picture and sound recording device 38 (VREC) via a second device socket C and lines 40, 42. The picture and sound recording device 38 may, for example, be a video recorder with a connected television apparatus 36. The actual pictures and the corresponding sound may thus be recorded and/or viewed directly.

The monitoring system is thus able to observe or listen if something moves or if a sound can be heard in a room or building to be monitored.

A monitoring computer 42 (ÜR) must also be connected on a line 44 to the terminal adapter 27 (TA-TV) via an interface D at the subscriber receiving the pictures and the sound in order to perform a computer-controlled comparison of individual pictures. The monitoring computer 42 (ÜR) permanently receives individual pictures. If the video camera 26 (CAM) is a firmly installed camera, identical pictures would always be transmitted to the monitoring computer 42 (ÜR). A change between successive pictures would only occur if a perpetrator is in the room to be monitored. The monitoring computer detects this change, transmits this information, and triggers an alarm.

It is also conceivable to utilize this system as the type of monitoring camera that triggers a certain function if the actual picture corresponds to a picture stored in the memory of the monitoring computer, for example if the actual picture of a license plate concurs with the license plate of a car authorized to gain access to a garage, whereupon the garage door is opened.

The connection of the monitoring computer 42 (ÜR) to the terminal adapter 27 may, for example, be produced by means of a known V.24 interface, as specified by CCITT Recommendation V.24.

Figure 3:
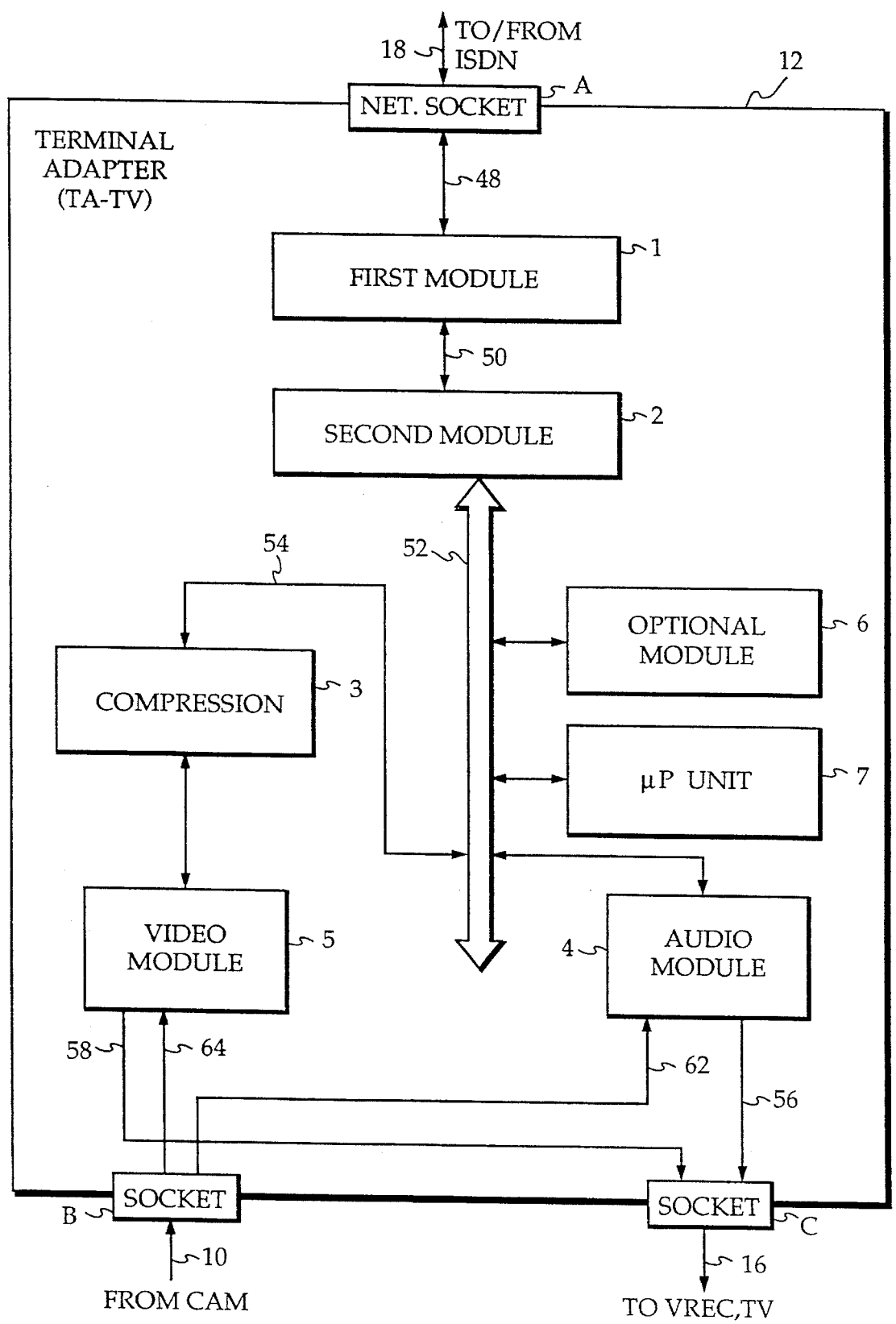

The terminal adapter according to the invention is in the following described with the aid of FIG. 3.

A terminal adapter 12 (TA-TV) such as shown in FIG. 1 may include a network socket A to provide a plug connection with an integrated services digital network 20 (ISDN). The network socket A is connected via a line 48 to a first module 1 which facilitates the access to a digital network, for example, the ISDN network 20. From it there exists an additional connection 50 to a second module 2 for ISDN-B-channel and ISDN-D-channel protocols. Standardized procedures for the exchange of information, which means the transmission of signals, are defined with the aid of the ISDN-B-channel and ISDN-D-channel protocols. The second module 2 is connected to a serial bus 52 (BUS).

A microprocessor unit 7 as well as an optional module 6 is connected to the serial bus 52 (BUS). Memory components, for example RAMs or ROMs or EEPROMs to store call numbers of subscribers, are also arranged in the microprocessor unit in addition to a microprocessor. The data protocols are, for example, processed according to the CCITT Standard H.221 or other protocols. Additional functions such as automatic dialing of subscribers, access control, and so forth may be performed by means of the optional module 6.

The serial bus BUS is additionally connected by a line 54 to an element 3 for compressing the signal data to be transmitted in form of blocks.

The video data to be transmitted in the form of blocks is packed or compressed in the element 3 which means that the quantity of data is reduced with the aid of this element 3. A possible compressing method is JPEG, or according to CCITT Standard H.261, for example.

In addition to the fact that signal data is compressed by means of the element 3, it is also possible to transmit video signals in noncompressed form by means of the element 3. This is necessary for an instance in which still pictures are transmitted with high resolution.

The element 3 for compressing the blocks is connected to a video module 5. The video module 5 processes and adapts incoming as well as outgoing video signals. Incoming and outgoing audio signals are processed and adapted in an audio module 4.

The audio module 4 as well as the video module 5 are each connected to at least one second device socket C via outgoing signal lines 56, 58. This second device socket C serves for the connection of a picture and sound reproduction device VREC, TV to the terminal adapter 12 (TA-TV) by the signal line 16.

The audio module 4 as well as the video module 5 are connected via incoming signal lines 62, 64 to at least a first device socket B. This first device socket B serves for the connection of a picture and sound recording device (CAM) via the signal line 10.

The following processes are performed for an instance in which a picture and sound recording device 8 (CAM) and a picture and sound reproduction device 14 (VREC, TV) are connected to the device 12 and in which video and audio signals are to be recorded and transmitted. The video signals and the audio signals on the line 10 are transmitted via the first device socket B to the video module 5 on the line 64 and the audio module 4 on the line 62. These signals are processed and adapted for the transmission process. The thus processed video signals are then fed to the element 3 to compress signal data to be transmitted in form of blocks. The video signal data is compressed in this element and transmitted by means of the serial bus 52 (BUS). The audio signal data are also transmitted to the bus 52 (BUS). The signal data are transmitted via the bus 52 (BUS) to the second module 2 and then to the first module 1, and subsequently transmitted via the network socket A to the integrated services digital network (ISDN) 20.

In the opposite instance in which video and audio signals are to be transmitted from the integrated services digital network (ISDN) and subsequently reproduced, the exact opposite sequence is performed. However, the corresponding signals are transmitted in this particular instance from the audio module 4 on the line 56 and the video module 5 on the line 58 to the second device socket C because this device socket leads to the picture and sound reproduction device (VREC, TV) on the line 16.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

I claim:

1. A terminal adapter for connection between an integrated services digital network and both a picture and sound recording device and a picture and sound reproduction device which are external to the terminal adapter, said terminal adapter transmitting video and audio signals directly to and from an integrated services digital network, said terminal adapter comprising:

a first device connector to connect said picture and sound recording device via first corresponding signal lines, the terminal adapter receiving video and audio signals from said picture and sound recording device via said first corresponding signal lines and said first device connector, a second device connector to connect said picture and sound reproduction device via second corresponding signal lines, the terminal adapter providing video and audio signals to said picture and sound reproduction device via said second device connector and said second corresponding signal lines, a network connector to connect to the integrated services digital network via third corresponding signal lines, the terminal adapter transmitting video and audio signals directly to and from the integrated services digital network via said network connector and said third corresponding signal lines, and adaptation means interconnecting said network connector with said first device connector and said second device connector within the terminal adapter, said adaptation means providing said first device connector and said second device connector direct access to the integrated services digital network via said network connector, said adaptation means performing an adaptation of the video and audio signals transmitted from the integrated services digital network via said third corresponding signal lines and said network connector for provision to said second device connector, and performing an adaption of the video and audio signals received from said first device connector for transmission to the integrated services digital network via said network connector and said third corresponding signal lines.

2. The terminal adapter of claim 1, wherein a keyboard is installed into the terminal adapter in order to dial a subscriber, said keyboard being connected to the terminal adapter via an interface.

3. The terminal adapter of claim 2, wherein the keyboard is also used to adjust transmitting or receiving parameters or both.

4. The terminal adapter of claim 1, wherein a remote control of said picture and sound reproduction device is used to dial a subscriber if said picture and sound reproduction device is connected to the terminal adapter via a SCART connector and a line, and wherein said picture and sound reproduction device is operated via the remote control.

5. The terminal adapter of claim 4, wherein the remote control is also used to adjust transmitting or receiving parameters or both.

6. The terminal adapter of claim 1, wherein a data processing device is additionally connected to the terminal adapter via an interface, and wherein a subscriber is dialed by entering the subscriber number into the data processing device, or wherein a subscriber number is programmed into the terminal adapter by means of the data processing device, or wherein the data processing device is available to perform computation procedures with the data obtained from the video signals.

7. The terminal adapter of claim 6, wherein a remote control device is utilized to dial subscribers and is also utilized to adjust transmitting or receiving parameters or both.

8. The terminal adapter of claim 1, wherein dialing of a subscriber is performed via the integrated services digital network, and wherein a terminal adapter corresponding to a subscriber number is accessed in response to a password.

9. The terminal adapter of claim 1, further responsive to a remote control signal provided by a remote control device for dialing a subscriber.

10. Terminal adapter for transmitting video and audio signals through an integrated services digital network (ISDN), comprising:

a network connector for providing a connection with the integrated services digital network, a first module which is connected in the terminal adapter to said network connector in order to access the integrated services digital network, a second module for ISDN-B-channel and ISDN-D-channel protocols which is connected in the terminal adapter to said first module in order to define standardized procedures, a serial bus for providing signal transmission within the terminal adapter, the serial bus being connected to said second module, an element to pack or compress signals to be transmitted in form of blocks, whereby said element is connected to the serial bus, a video module which is connected to the element in order to process the video signals, an audio module which is connected to the serial bus in order to process the audio signals, an optional module which is connected to the serial bus, whereby different functions may be performed by the optional module, a microprocessor unit with memory components which is connected to the serial bus, at least one first device connector to connect a picture and sound recording device, whereby the first device connector is connected to the audio module as well as the video module, and at least one second device connector to connect a picture and sound reproduction device, whereby the second device connector is connected to the audio module as well as the video module.

11. Terminal adapter according to claim 10, wherein the module is constructed such that it may be adapted to an ISDN-network or a broadband-ISDN-network.

* * * * *